US011567272B2

(12) United States Patent
Wakabayashi et al.

(10) Patent No.: US 11,567,272 B2
(45) Date of Patent: Jan. 31, 2023

(54) OPTICAL COUPLING DEVICE

(71) Applicants: Shimadzu Corporation, Kyoto (JP); OSAKA UNIVERSITY, Osaka (JP)

(72) Inventors: Naoki Wakabayashi, Kyoto (JP); Koji Tojo, Kyoto (JP); Masahiro Tsukamoto, Osaka (JP)

(73) Assignees: Shimadzu Corporation, Kyoto (JP); Osaka University, Suita (JP)

( * ) Notice: Subject to any disclaimer, the term of this patent is extended or adjusted under 35 U.S.C. 154(b) by 0 days.

(21) Appl. No.: 17/270,344

(22) PCT Filed: Aug. 23, 2018

(86) PCT No.: PCT/JP2018/031183
§ 371 (c)(1),
(2) Date: Feb. 22, 2021

(87) PCT Pub. No.: WO2020/039556
PCT Pub. Date: Feb. 27, 2020

(65) Prior Publication Data
US 2021/0247573 A1    Aug. 12, 2021

(51) Int. Cl.
*G02B 6/42* (2006.01)
(52) U.S. Cl.
CPC .................. *G02B 6/4206* (2013.01)
(58) Field of Classification Search
CPC .................................. G02B 6/42; G02B 6/00
USPC ......................................................... 385/33
See application file for complete search history.

(56) References Cited

U.S. PATENT DOCUMENTS

| 7,050,238 | B2 | 5/2006 | Takahashi et al. |
| 7,444,047 | B2 | 10/2008 | Sonoda et al. |
| 7,970,040 | B1 * | 6/2011 | Sprangle ................. H01S 3/067 372/98 |
| 9,746,615 | B2 | 8/2017 | Saikawa et al. |

(Continued)

FOREIGN PATENT DOCUMENTS

| CN | 105629390 A | 6/2016 |
| JP | 2005-114977 A | 4/2005 |

(Continued)

OTHER PUBLICATIONS

Written Opinion of the International Searching Authority for PCT/JP2018/031183 dated Feb. 27, 2020.

*Primary Examiner* — Kaveh C Kianni
(74) *Attorney, Agent, or Firm* — Muir Patent Law, PLLC (57) ABSTRACT

This optical coupling device couples a plurality of beams to a single fiber. A plurality of light sources is arranged at predetermined intervals and emits the plurality of beams. A plurality of collimating lens is arranged to face the plurality of light sources and collimates the plurality of beams emitted from the plurality of light sources. A reduction optical system reduces the beam diameter of the plurality of beams collimated by the plurality of collimating lens. A focusing lens focuses the plurality of beams reduced by the reduction optical system on a fiber. A first distance between the light source and the collimating lens arranged so as to correspond to a beam passing through the center of the reduction optical system is different from a second distance between the light source and the collimating lens arranged so as to correspond to a beam passing through the end portion of the reduction optical system.

1 Claim, 9 Drawing Sheets

(56) References Cited

U.S. PATENT DOCUMENTS

| | | | |
|---|---|---|---|
| 2002/0191296 A1* | 12/2002 | Kusuyama | G02B 3/005 359/741 |
| 2004/0027681 A1* | 2/2004 | Sunagawa | G03F 7/7005 359/643 |
| 2005/0073750 A1* | 4/2005 | Takahashi | G02B 27/09 359/668 |
| 2005/0200947 A1* | 9/2005 | Hirata | G02B 21/0004 359/368 |
| 2007/0237455 A1* | 10/2007 | Sonoda | G02B 6/4206 385/33 |
| 2010/0044105 A1* | 2/2010 | Faircloth | E21B 43/11 175/16 |
| 2010/0208487 A1* | 8/2010 | Li | G02B 6/32 362/555 |
| 2017/0082805 A1* | 3/2017 | Saikawa | G02B 6/43 |

FOREIGN PATENT DOCUMENTS

| | | |
|---|---|---|
| JP | 2007-163947 A | 6/2007 |
| WO | 2015/193966 A1 | 12/2015 |
| WO | 2016/117108 A1 | 7/2016 |

\* cited by examiner

OPTICAL COUPLING DEVICE

TECHNICAL FIELD

The present invention relates to an optical coupling device for coupling beams emitted from a plurality of light sources to a single fiber core.

BACKGROUND OF THE INVENTION

As a conventional optical coupling device, an optical power combining optical system and a multiplexing optical system are known in which beams emitted from a plurality of laser diodes (LD) are coupled to a single fiber to acquire a high output from the fiber (see Patent Documents 1 and 2). In this optical coupling device, the beams from the light sources are passed through a reduction optical system, such as, e.g., a single lens and a telescope, and are then focused on a fiber by a focusing lens.

In this optical coupling device, the beam of the laser diode arranged at the center of the single lens or the telescope is incident on the central axis thereof. However, the beam of the laser diode other than the laser diode arranged at the center of the single lens or the telescope is incident on a portion of the single lens or the telescope away from the central axis thereof.

PRIOR ART DOCUMENT

Patent Document

Patent Document 1: Japanese Unexamined Patent Application Publication No. 2005-114977
Patent Document 2: Japanese Unexamined Patent Application Publication No. 2007-163947

SUMMARY OF THE INVENTION

Problems to be Solved by the Invention

However, when these beams are focused on a fiber by a focusing lens, these beams generate a spherical aberration, which increases the focusing diameter of the beams. Therefore, the fiber coupling efficiency deteriorates.

The present invention provides an optical coupling device capable of improving a fiber coupling efficiency by suppressing a spherical aberration of beams from a plurality of light sources.

Means for Solving the Problem

In some examples, an optical coupling device for coupling a plurality of beams to a single fiber, includes:
  a plurality of light sources configured to emit the plurality of beams, the plurality of light source being arranged at predetermined intervals;
  a plurality of collimating lens configured to collimate the plurality of beams emitted from the plurality of light sources, the plurality of collimating lens being arranged to face the plurality of light sources;
  a reduction optical system configured to reduce a beam diameter of the plurality of beams collimated by the plurality of collimating lens; and
  a focusing lens configured to focus the plurality of beams reduced by the reduction optical system on the fiber;
  a first distance between the light source arranged to correspond to the beam passing through a center of the reduction optical system and the collimating lens is different from a second distance between the light source arranged to correspond to the beam passing through an end portion of the reduction optical system and the collimating lens.

In some examples, when a spherical aberration due to the reduction optical system is positive, the second distance is set to be shorter than the first distance, and when the spherical aberration due to the reduction optical system is negative, the second distance is set to be longer than the first distance.

In some examples, the optical coupling device may also include:
  a collimator in which the light source and the collimating lens arranged so as to correspond to the beam passing through the end portion of the reduction optical system are integrated,
  wherein the collimator is inclined at a predetermined angle so that the beam is obliquely incident on the reduction optical system.

In some examples, an optical coupling device for coupling a plurality of beams to a single fiber includes:
  a plurality of light sources configured to emit the plurality of beams, the plurality of light sources being arranged at predetermined intervals;
  a plurality of collimating lens configured to collimate the plurality of beams emitted from the plurality of light sources, the plurality of collimating lens being arranged to face the plurality of light sources;
  a reduction optical system configured to reduce a beam diameter of the plurality of beams collimated by the plurality of collimating lens;
  a focusing lens configured to focus the plurality of beams reduced by the reduction optical system on the fiber; and
  a collimator in which the light source and the collimating lens arranged so as to correspond to the beam passing through an end portion of the reduction optical system are integrated,
  wherein the collimator is inclined at a predetermined angle so that the beam is obliquely incident on the reduction optical system.

In some examples, an optical coupling device for coupling a plurality of beams to a single fiber includes:
  a plurality of light sources configured to emit the plurality of beams, the plurality of light sources being arranged at predetermined intervals;
  a plurality of collimating lens configured to collimate the plurality of beams emitted from the plurality of light sources, the plurality of collimating lens being arranged to face the plurality of light sources;
  a reduction optical system configured to reduce a beam diameter of the plurality of beams collimated by the plurality of collimating lens; and
  a focusing lens configured to focus the plurality of beams reduced by the reduction optical system on a fiber,
  wherein the light source and the collimating lens arranged so as to correspond to the beam passing through a center of the reduction optical system are arranged on an optical axis, and the light source and the collimating lens arranged so as to correspond to the beam passing through an end portion of the reduction optical system are arranged with a center of the collimating lens shifted with respect to a center of the light source.

Effects of the Invention

According to the present invention, since the first distance between the light source and the collimating lens arranged so as to correspond to the beam passing through a center of the reduction optical system is configured to be different from the second distance between the light source and the collimating lens arranged so as to correspond to the beam passing through the end portion of the reduction optical system, it is possible to improve the fiber coupling efficiency by suppressing the spherical aberration of the light from the plurality of light sources.

EMBODIMENTS FOR CARRYING OUT THE INVENTION

Example 1

Figure 1:
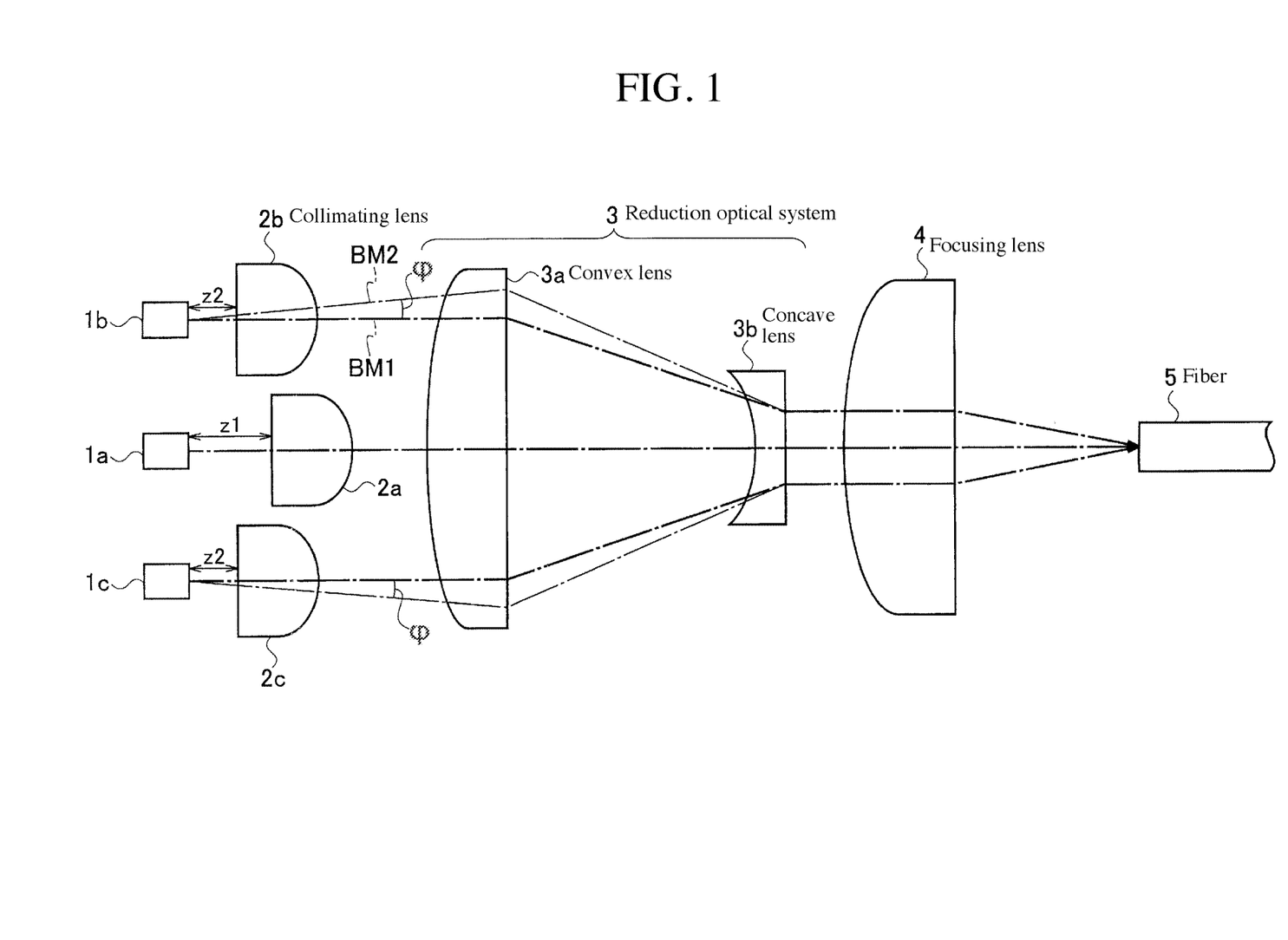
FIG. 1 is a diagram showing the entire configuration of an optical coupling device according to Example 1 of the present invention.

Hereinafter, an optical coupling device according to an embodiment of the present invention will be described in detail with reference to the attached drawings. FIG. 1 is a diagram showing the entire configuration of the optical coupling device according to Example 1 of the present invention. The optical coupling device is configured to couple a plurality of beams to a single fiber 5 and is provided with a plurality of laser diodes 1*a* to 1*c*, a plurality of collimating lenses 2*a* to 2*c*, a reduction optical system 3, a focusing lens 4, and a fiber 5.

The plurality of laser diodes 1*a* to 1*c* corresponds to the plurality of light sources of the present invention and is arranged at predetermined intervals. Each laser diode emits a laser beam. In this Example, three laser diodes are arranged, but not limited thereto, four or more laser diodes may be arranged at predetermined intervals.

As the light source, a light-emitting diode, a surface-emitting laser (VCSEL), or an electroluminescent (EL) may be used in place of each of the plurality of laser diodes 1*a* to 1*c*.

The plurality of collimating lenses 2*a* to 2*c* is arranged to face the plurality of laser diodes 1*a* to 1*c*, respectively, to collimate the plurality of beams emitted from the plurality of laser diodes 1*a* to 1*c*.

The reduction optical system 3 is composed of a telescope having a convex lens 3*a* and a concave lens 3*b* and is configured to reduce the beam diameter and the beam spacing of the plurality of beams from the plurality of collimating lenses 2*a* to 2*c* to guide the beams to the focusing lens 4.

The convex lens 3*a* and the concave lens 3*b* each consists of a spherical lens and has a spherical aberration. The focusing lens 4 focuses the plurality of beams reduced by the reduction optical system 3 on the fiber 5.

A first distance Z1 between the laser diode 1*a* and the collimating lens 2*a* arranged so as to correspond to a beam passing through a center of the reduction optical system 3 is configured to be different from a second distance Z2 between the laser diode 1*b* (1*c*) and the collimating lens 2*b* (2*c*) arranged so as to correspond to a beam passing through an end portion of the convex lens 3*a* of the reduction optical system 3.

When the spherical aberration of the reduction optical system 3 equipped with the convex lens 3*a* and the concave lens 3*b* is positive, the second distance Z2 is made smaller than the first distance Z1.

Figure 2:
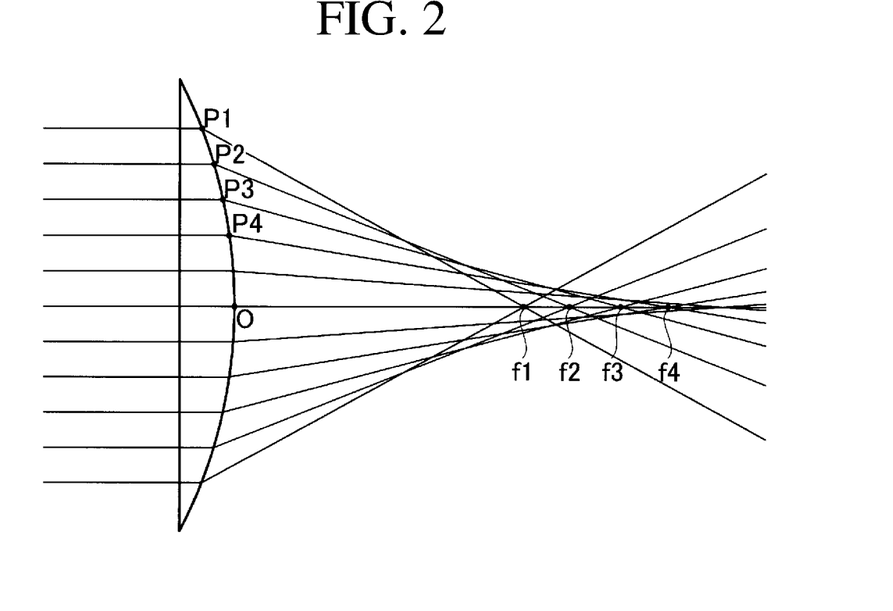
FIG. 2 shows focusing properties of the lens used in the optical coupling device according to Example 1 of the present invention.

Next, the operation of the optical coupling device of Example 1 configured as described above will be described. FIG. 2 shows the focusing property of the lens used for the optical coupling device. The beam incident on the convex lens becomes longer in the focal length to the focal point f4 as it is closer to the center O of the lens, and the shorter the focal lengths to the focal points f1 and f2 as it approaches the end portions P1 and P2 of the lens.

Therefore, a spherical aberration is generated. When the light incident on the periphery of the lens is focused on a side closer to the lens than the focal point by the light incident on the vicinity of the center of the lens, it is referred to as a positive spherical aberration. In FIG. 2, a positive spherical aberration is generated.

In Example 1 shown in FIG. 1, when the distance between the laser diode 1*b* (1*c*) and the collimating lens 2*b* (2*c*) arranged so as to correspond to the end portion of the convex lens 3*a* is Z1, the beams BM1 emitted from the collimating lenses 2*b* and 2*c* are parallel light. Here, it is considered that a positive spherical aberration is generated when the beam is incident on the outer side of the convex lens 3*a*.

On the other hand, in Example 1, the distance Z2 between the laser diode 1*b* (1*c*) and the collimating lens 2*b* (2*c*) arranged so as to correspond to the end portion of the convex lens 3*a* is made smaller than the first distance Z1. The beam BM2 diverges (expands outward by the angle φ with respect to the collimated light beam BM1) and is incident on the end portion side (outer side) of the convex lens 3*a*.

Therefore, the diverging beam BM2 is condensed by the convex lens 3*a*, and the focal position moves further than the focal position when the beam BM1 is condensed by the convex lens 3*a*. Therefore, it is possible to suppress the positive spherical aberration.

Figure 3:
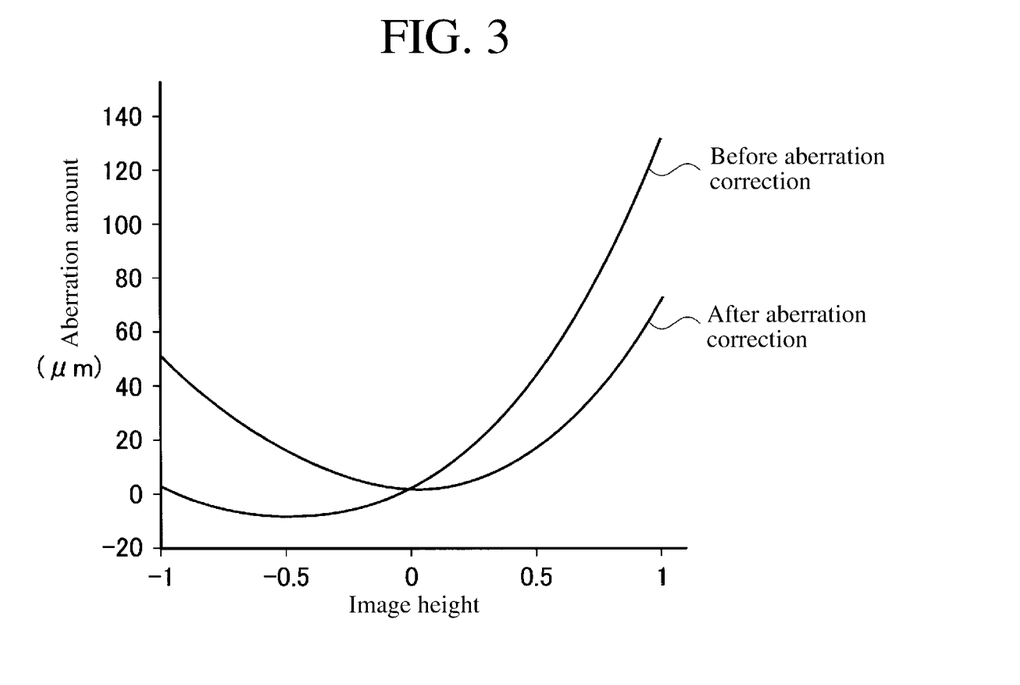
FIG. 3 is a diagram showing aberrations before and after correcting the aberration at a position where the beam from the laser diode 1*b* of the optical coupling device according to Example 1 of the present invention is condensed by the focusing lens.

FIG. 3 shows aberrations before and after correcting the aberration at the position where the beam from the laser diode 1*b* is condensed by the focusing lens. The vertical axis indicates the aberration amount, and the horizontal axis indicates the image height after passing through the collimating lens. FIG. 3 shows the comparison between the aberration amount before spherical aberration correction when the distance Z2 is equal to the distance Z1 and the aberration amount after spherical aberration correction when the distance Z2 is different from the distance Z1.

Before the aberration correction, when the image height increases (e.g., the image height 1), the aberration amount increases.

On the other hand, after the aberration correction of Example 1, when the image height becomes large, the aberration amount decreases as compared with that before the correction. For example, as shown in FIG. 1, when focusing on the fiber 5 of the core of 100 μm, when the aberration amount shown in FIG. 3 exceeds 100 μm, the beam diameter also exceeds 100 μm. Therefore, the power is lost at the fiber 5.

On the other hand, after the aberration correction of Example 1, the aberration amount is 100 μm or less at any image height, and therefore the loss at the fiber 5 can be reduced as compared with the case before the aberration correction.

According to the optical coupling device of Example 1 as described above, as compared with the first distance Z1 between the laser diode 1a and the collimating lens 2a arranged so as to correspond to the beam passing through the center of the reduction optical system 3, the second distance Z2 between the laser diode 1b (1c) and the collimating lens 2b (2c) arranged so as to correspond to the beam passing through the end portion of the reduction optical system 3 is configured to be smaller. Therefore, it is possible to suppress the spherical aberration of the light from the laser diodes 1a to 1c to improve the fiber coupling efficiency.

Example 2

Figure 4:
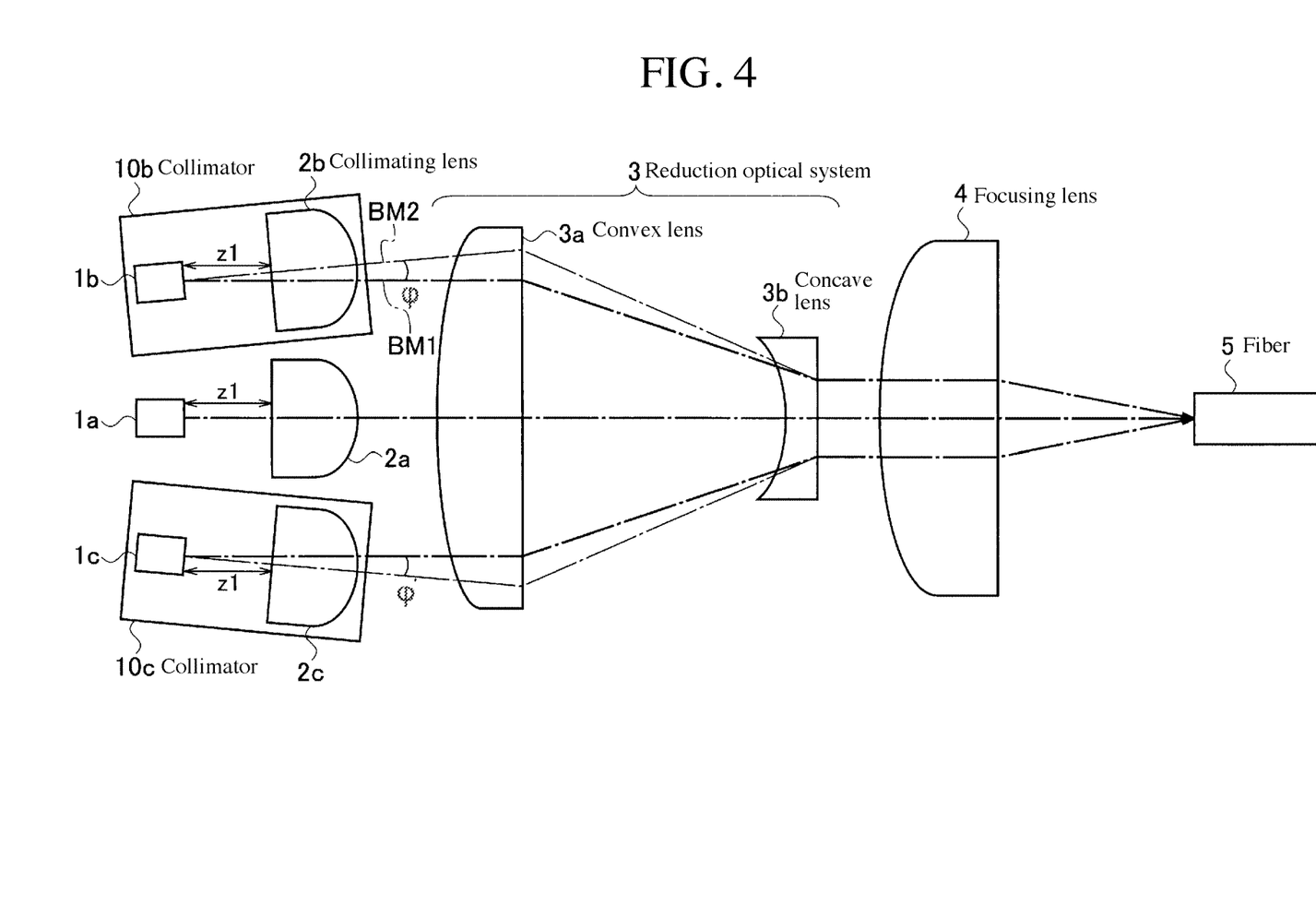
FIG. 4 is a diagram showing the entire configuration of an optical coupling device according to Example 2 of the present invention.

FIG. 4 is a diagram showing the entire configuration of an optical coupling device according to Example 2 of the present invention. The optical coupling device according to Example 2 includes a reduction optical system 3 having a convex lens 3a and a concave lens 3b. When the beams are incident on a position away from the central axis of the focusing lens 4, the spherical aberration is considered to be positive. The optical coupling device of Example 2 is provided with a collimator 10b (10c) in which a laser diode 1b (1c) and a collimating lens 2b (2c) arranged so as to correspond to the beam passing through the end portion of the reduction optical system 3 are integrated.

The collimator 10b (10c) is arranged so as to be inclined at a predetermined angle φ so that the beam is obliquely incident on the reduction optical system 3. More specifically, the collimator 10b (10c) is arranged such that the beam BM2 emitted from the collimator 10b (10c) is inclined outward by a predetermined angle φ (φ>0) with respect to the beam BM1 consisting of parallel light, and causes the beam BM2 to be incident on the convex lens 3a obliquely.

The rest of the configuration shown in FIG. 4 is the same as the configuration of the optical coupling device according to Example 1 shown in FIG. 1, and therefore the descriptions of the same portions will be omitted.

According to the optical coupling device of Example 2 configured as described above, since the collimator 10b (10c) is arranged such that the beam BM2 is inclined outward by a predetermined angle φ with respect to the beam BM1, the beam BM2 is diverged with respect to the beam BM1, and the beam BM2 is obliquely incident on the convex lens 3a. Therefore, it is possible to suppress the spherical aberration of the light from the laser diodes 1a to 1c to improve the fiber coupling efficiency.

Example 3

Figure 5:
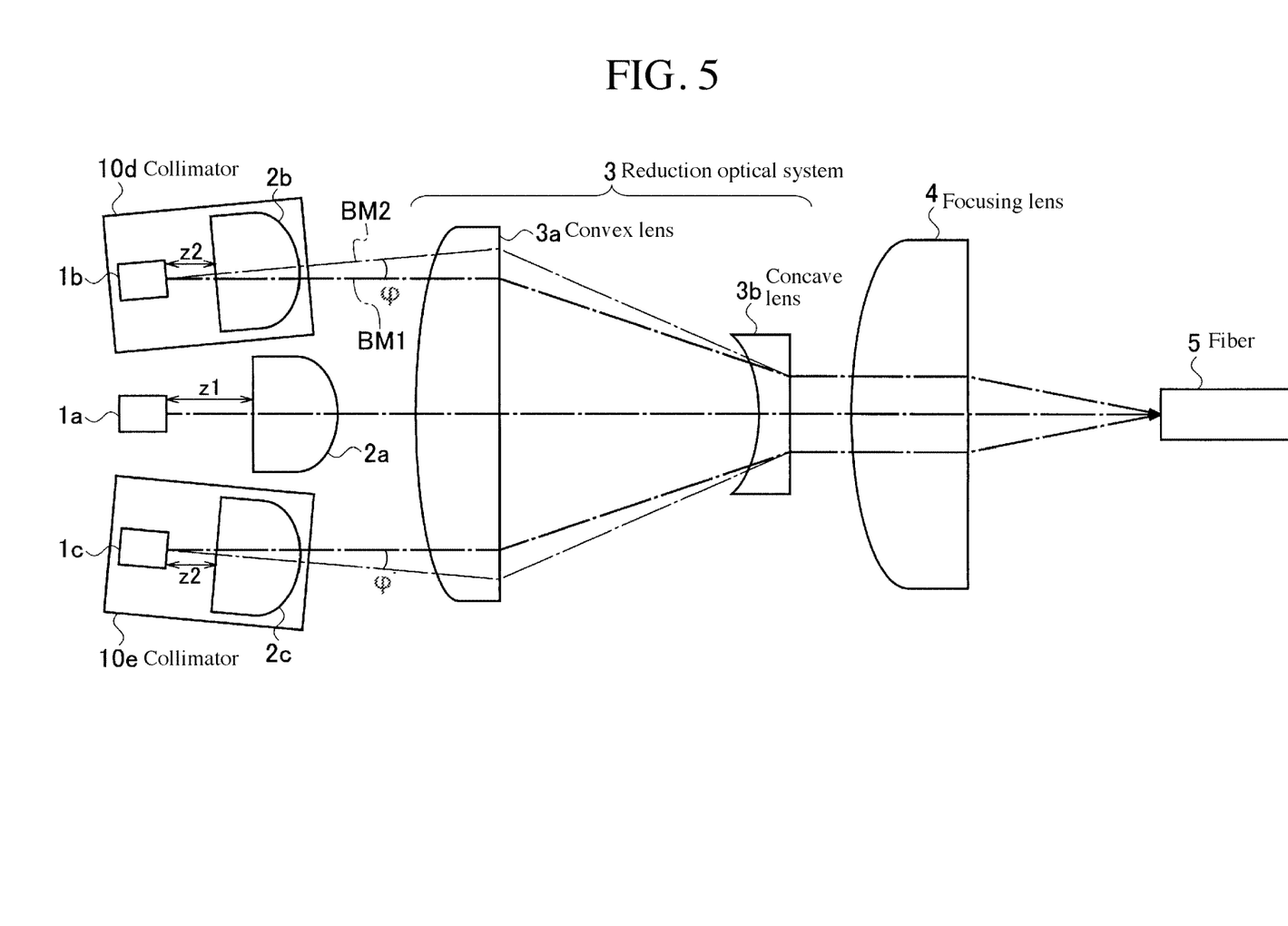
FIG. 5 is a diagram showing the entire configuration of an optical coupling device according to Example 3 of the present invention.

FIG. 5 is a diagram showing the entire configuration of an optical coupling device according to Example 3 of the present invention. The optical coupling device according to Example 3 includes a reduction optical system 3 having a convex lens 3a and a concave lens 3b. When the beam is incident on a position away from the central axis of the focusing lens 4, the spherical aberration is considered to be positive. In the optical coupling device according to Example 3 shown in FIG. 5, the distance Z2 between the laser diode 1b (1c) and the collimating lens 2b (2c) arranged so as to correspond to the end portion of the convex lens 3a is smaller than the first distance Z1.

The collimator 10d (10e) is arranged so as to be inclined by a predetermined angle φ to diverge the beam BM2 with respect to the beam BM1, and causes the beam BM2 to be incident on the convex lens 3a obliquely.

According to the optical coupling device of Example 3 configured as described above, the distance Z2 between the laser diode 1b (1c) and the collimating lens 2b (2c) is made smaller than the first distance Z1, and the collimator 10d (10e) is arranged so as to be inclined by a predetermined angle φ to diverge the beam BM2 with respect to the beam BM1. Therefore, the combined effect in which the effect of the optical coupling device of Example 1 and the effect of the optical coupling device of Example 2 are combined can be obtained.

Example 4

Figure 6:
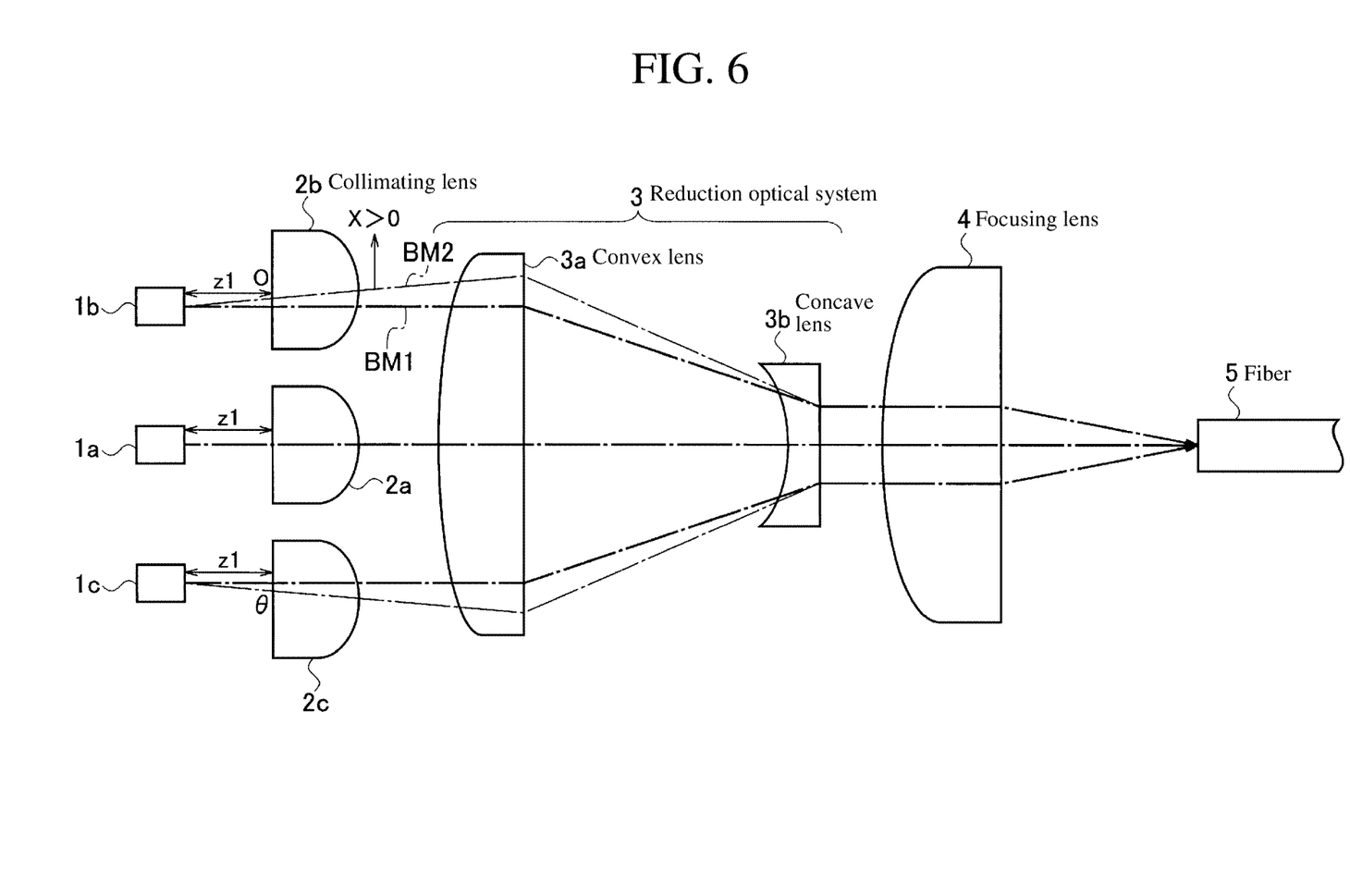
FIG. 6 is a diagram showing the entire configuration of an optical coupling device according to Example 4 of the present invention.

FIG. 6 is a diagram showing the entire configuration of an optical coupling device according to Example 4 of the present invention. The optical coupling device according to Example 4 includes a reduction optical system 3 having a convex lens 3a and a concave lens 3b. When the beam is incident on a position away from the central axis of the focusing lens 4, the spherical aberration is considered to be positive. In the optical coupling device according to Example 4, the laser diode 1a and the collimating lens 2a arranged so as to correspond to the beam passing through the center of the reduction optical system 3 are arranged on the optical axis.

The laser diode 1b and the collimating lens 2b arranged so as to correspond to the beam passing through the end portion of the reduction optical system 3 are arranged such that the center O of the collimating lens 2b is shifted in the positive X-direction (X>0) with respect to the center of the laser diode 1b.

The laser diode 1c and the collimating lens 2c arranged so as to correspond to the beam passing through the end portion of the reduction optical system 3 are arranged such that the center O of the collimating lens 2c is shifted in the negative X-direction (X<0) with respect to the center of the laser diode 1c.

According to the optical coupling device according to Example 4, since the center O of the collimating lens 2b is shifted in the positive X-direction (X>0) with respect to the center of the laser diode 1b, the beam BM2 diverged outward than the beam BM1 is incident on the convex lens 3a.

Further, since the center O of collimating lens 2c is shifted in the negative X-direction (X<0) with respect to the center of the laser diode 1c, the beam BM2 diverged outward than the beam BM1 is incident on the convex lens 3a. Therefore, the same effect as the effect of the optical coupling device of Example 1 can be obtained.

Example 5

Figure 7:
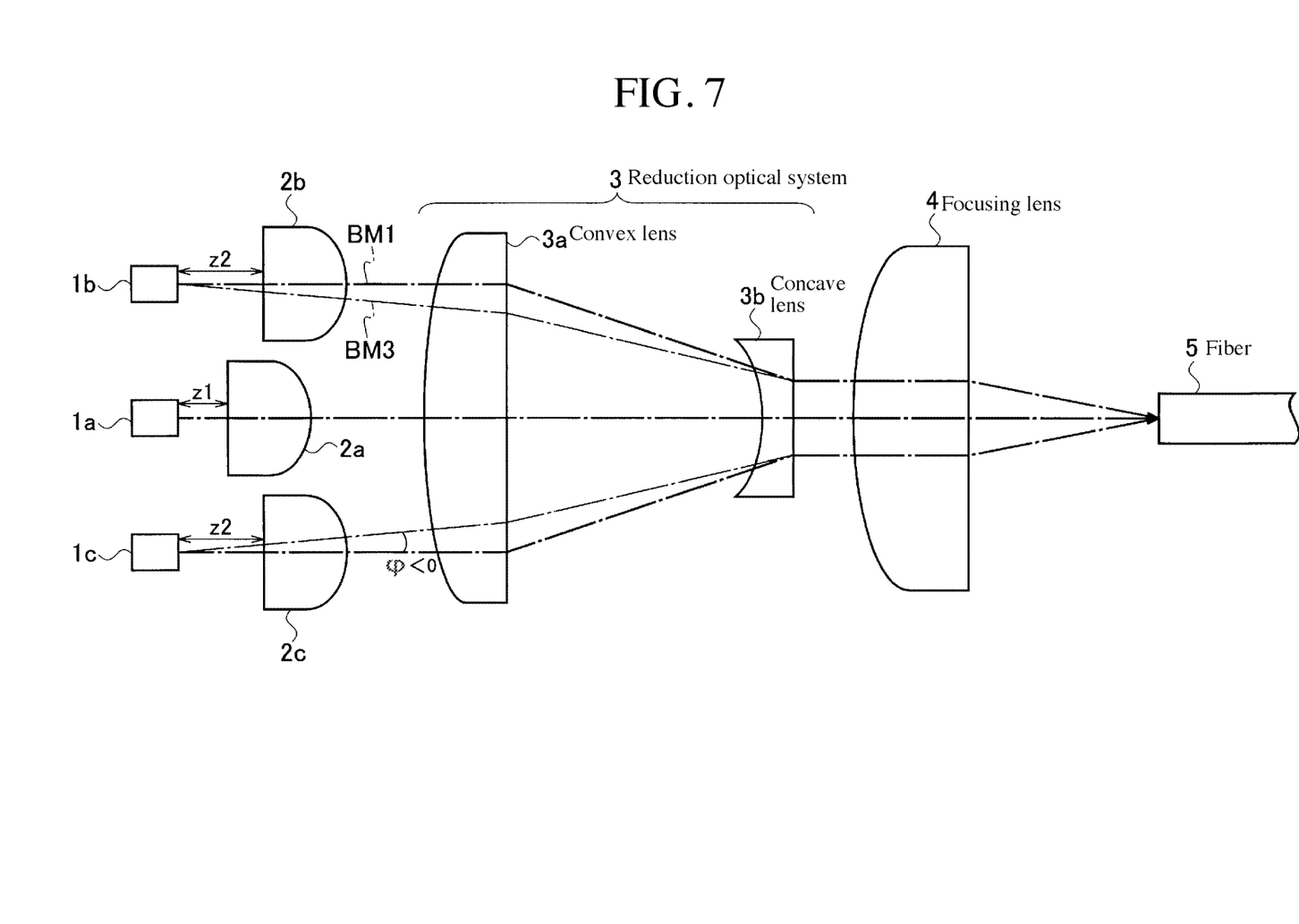
FIG. 7 is a diagram showing the entire configuration of an optical coupling device according to Example 5 of the present invention.

FIG. 7 is a diagram showing the entire configuration of an optical coupling device according to Example 5 of the present invention. The optical coupling device according to Example 5 includes a reduction optical system 3. When the beam is incident on a position away from the central axis of the focusing lens 4, the spherical aberration is considered to be positive, and therefore the second distance Z2 is made to be larger than the first distance Z1.

The rest of the configuration shown in FIG. 7 has the same configuration as that of the optical coupling device according to Example 1, and therefore, the same reference numerals are assigned to the same portions, and the descriptions thereof will be omitted.

According to the optical coupling device of Example 5, since the spherical aberration due to the reduction optical system 3 is negative and the second distance Z2 is made larger than the first distance Z1, the beam BM3 passed through the collimating lens 2b (2c) from the laser diode 1b (1c) is condensed inward with respect to the parallel beam BM1 by the angle φ (φ0) and is incident on the center side of the convex lens 3a. Therefore, the same effect as the effect of the optical coupling device of Example 1 can be obtained.

Example 6

Figure 8:
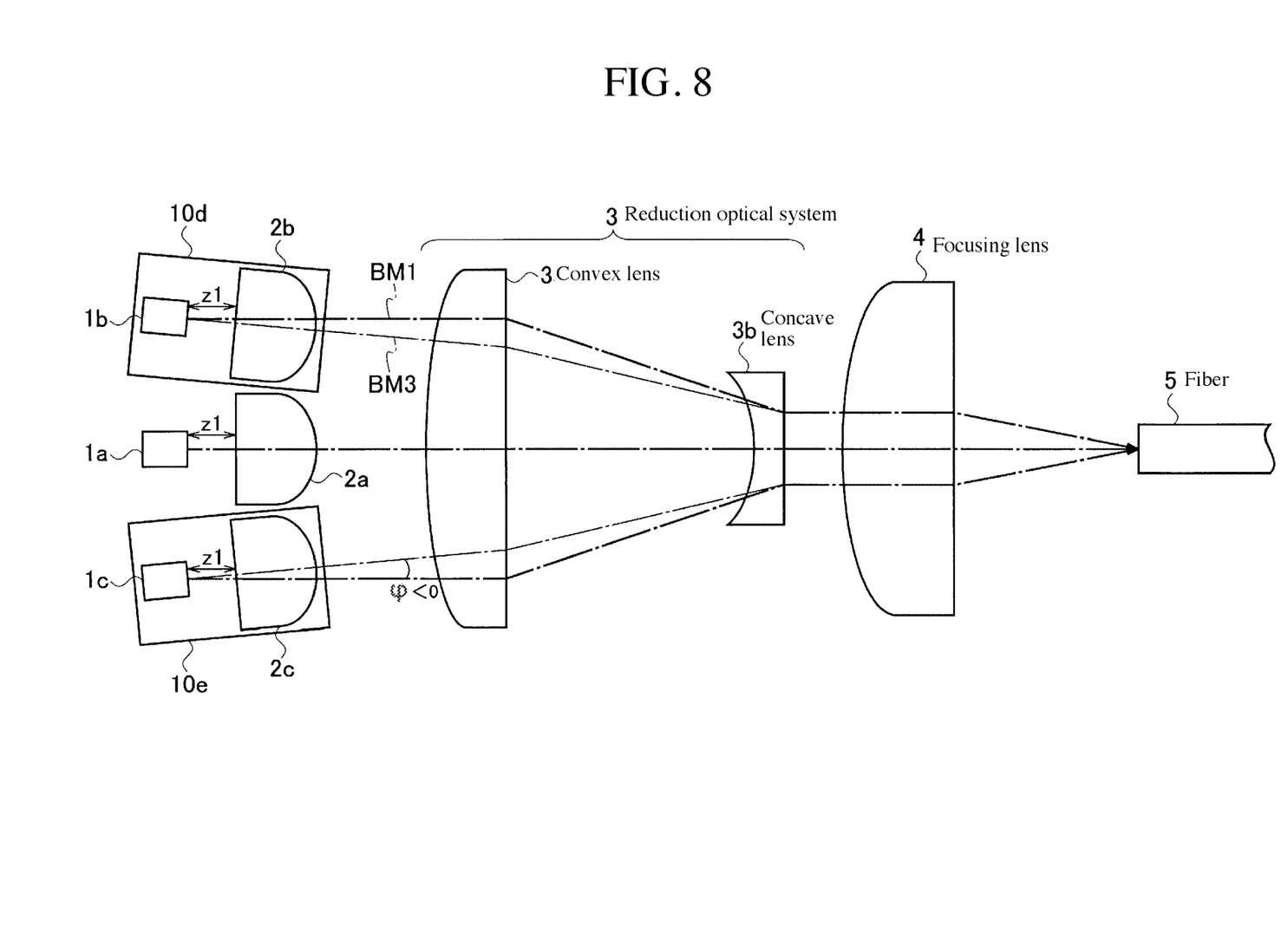
FIG. 8 is a diagram showing the entire configuration of an optical coupling device according to Example 6 of the present invention.

FIG. 8 is a diagram showing the entire configuration of an optical coupling device according to Example 6 of the present invention. In the optical coupling device according to Example 6, the spherical aberration due to the reduction optical system 3 is negative.

The collimator 10d (10e) is arranged such that the beam BM3 emitted from the collimator 10d (10e) is inclined inward by a predetermined angle φ (φ<0) with respect to the beam BM1 composed of collimated light, and causes the beam BM3 to be incident on the convex lens 3a obliquely.

The rest of the configuration shown in FIG. 8 has the same configuration as that of the optical coupling device according to Example 2, and therefore the same reference numerals are assigned to the same portions, and the descriptions thereof will be omitted.

According to the optical coupling device according to Example 6, the same effect as the effect of optical coupling device of Example 2 can be obtained.

Example 7

Figure 9:
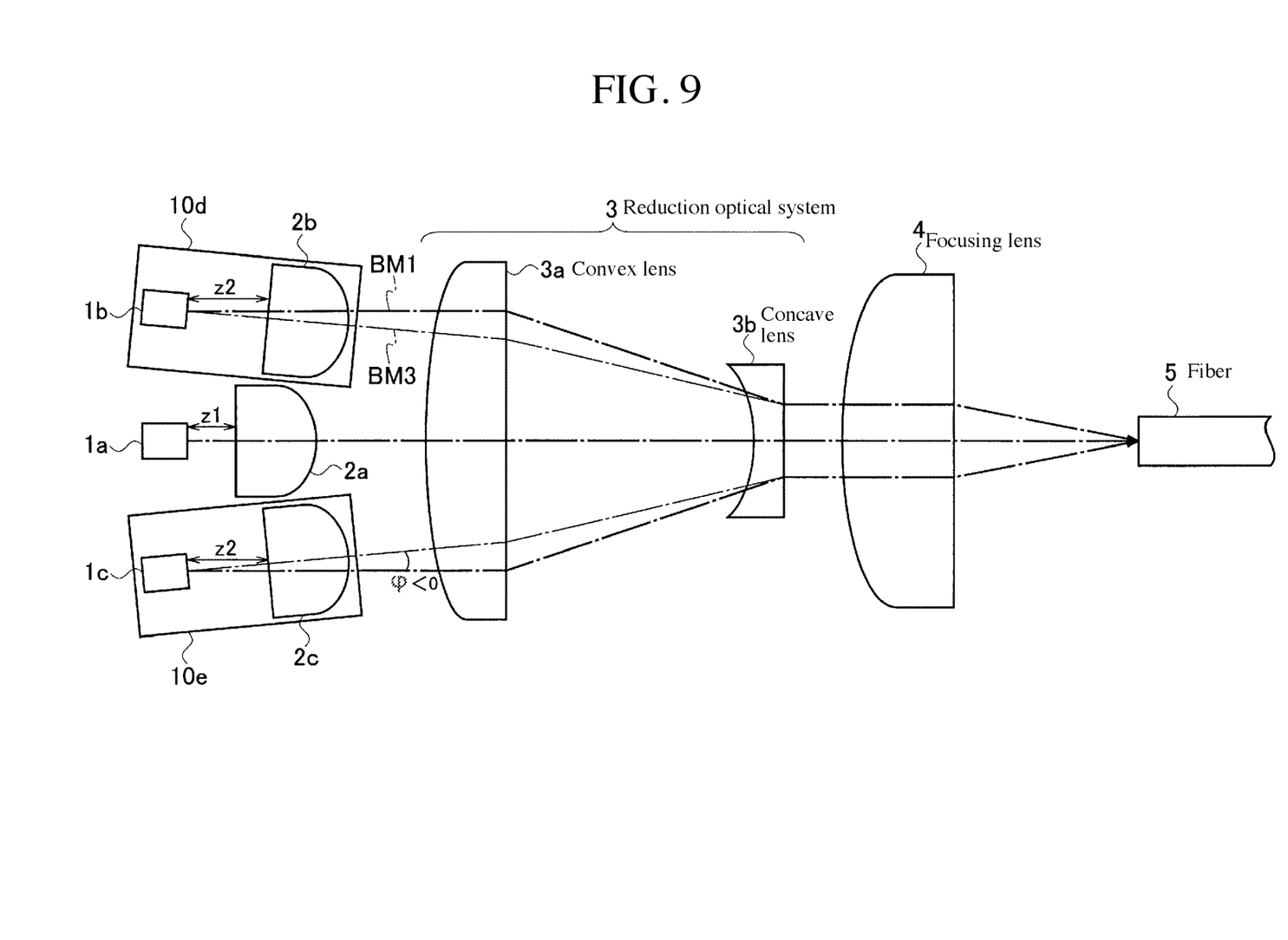
FIG. 9 is a diagram showing the entire configuration of an optical coupling device according to Example 7 of the present invention.

FIG. 9 is a diagram showing the entire configuration of an optical coupling device according to Example 7 of the present invention. In the optical coupling device according to Example 7, the spherical aberration caused by the reduction optical system 3 is negative, and the second distance Z2 is larger than the first distance Z1.

The collimator 10d (10e) is arranged such that the beam BM3 emitted from the collimator 10d (10e) is inclined inward by a predetermined angle φ (φ<0) with respect to the beam BM1 composed of collimated light, and causes the beam BM3 to be incident on the convex lens 3a obliquely.

The rest of the configuration shown in FIG. 9 has the same configuration as that of the optical coupling device according to Example 3, and therefore, the same reference numerals are assigned to the same portions, and the descriptions thereof will be omitted.

According to the optical coupling device according to Example 7, the effect in which the effect of the optical coupling device of Example 1 and the effect of the optical coupling device of Example 2 are combined can be obtained.

Example 8

Figure 10:
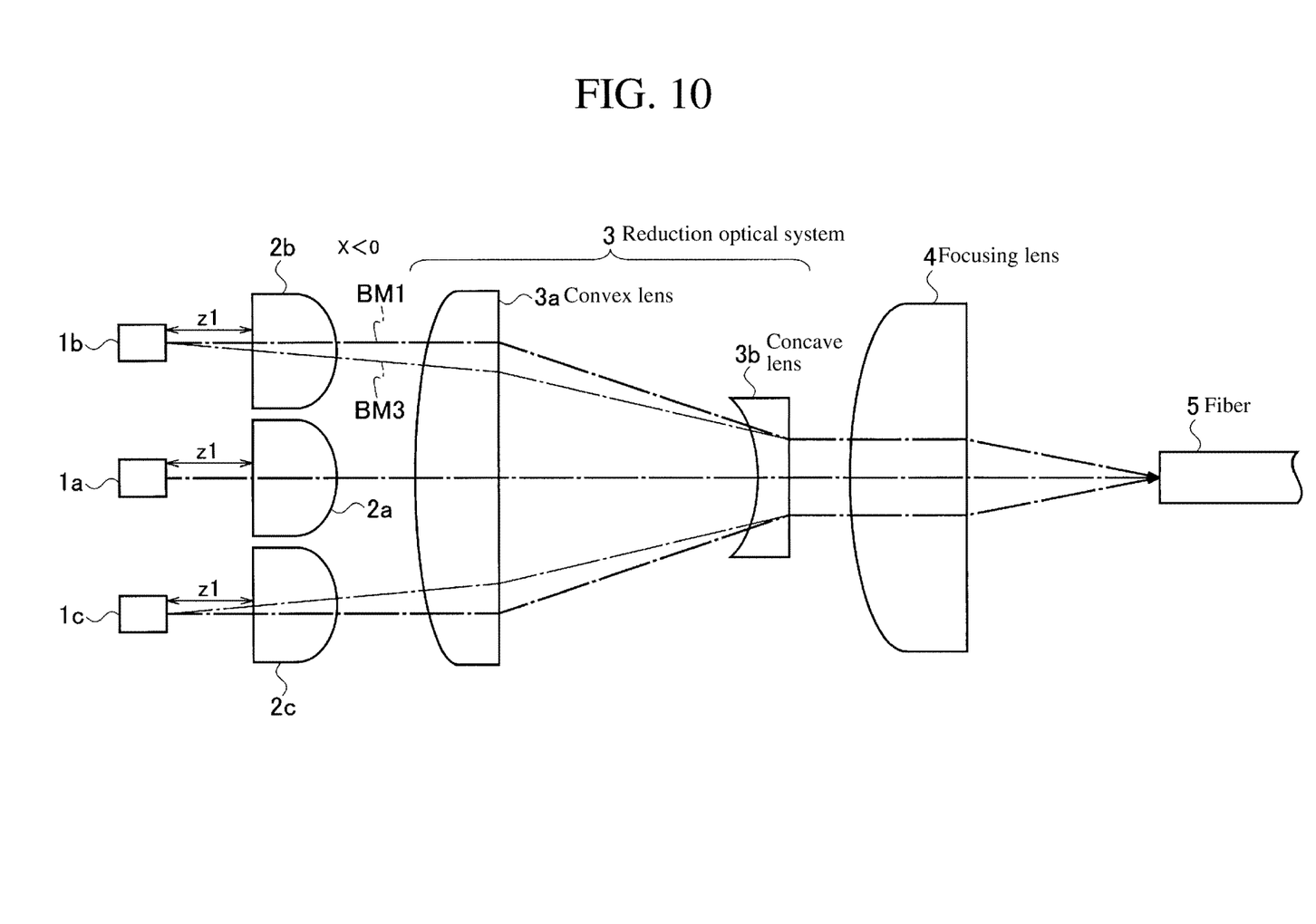
FIG. 10 is a diagram showing the entire configuration of an optical coupling device according to Example 8 of the present invention.

FIG. 10 is a diagram showing the entire configuration of an optical coupling device according to Example 8 of the present invention. In the optical coupling device according to Example 8, the spherical aberration due to the reduction optical system 3 is negative.

In the optical coupling device according to Example 8, the laser diode 1a and the collimating lens 2a arranged so as to correspond to the beam passing through the center of the reduction optical system 3 are arranged on the optical axis.

The laser diode 1b and the collimating lens 2b arranged so as to correspond to the beam passing through the end portion of the reduction optical system 3 are arranged such that the center O of the collimating lens 2b is shifted in the negative X-direction (X<0) with respect to the center of the laser diode 1b.

The laser diode 1c and the collimating lens 2c arranged so as to correspond to the beam passed through the end portion of the reduction optical system 3 are arranged such that the center O of the collimating lens 2c is shifted in the positive X-direction (X>0) with respect to the center of the laser diode 1c.

According to the optical coupling device according to Example 8, since the center O of the collimating lens 2b is displaced in the negative X-direction (X<0) with respect to the center of the laser diode 1b, the beam BM3 focused inward of the beam BM1 is incident on the convex lens 3a.

Further, since the center O of the collimating lens 2c is shifted from the center of the laser diode 1c in the positive X-direction (X>0), the beam BM3 focused inward of the beam BM1 is incident on the convex lens 3a. Therefore, the same effect as the effect of the optical coupling device of Example 1 can be obtained.

Note that the present invention is not limited to the optical coupling devices of Example 1 to Example 8 described above. Any two or more Examples of the optical coupling devices of Example 1 to Example 8 may be combined.

INDUSTRIAL APPLICABILITY

The present invention is applicable to laser machining, exposure, lighting, imaging, medicine, and the like.

The invention claimed is:

1. An optical coupling device for coupling a plurality of beams to a single fiber, comprising:
   a plurality of light sources configured to emit the plurality of beams, the plurality of light sources being arranged at predetermined intervals;
   a plurality of collimating lens configured to collimate the plurality of beams emitted from the plurality of light sources, the plurality of collimating lens being arranged to face the plurality of light sources;
   a reduction optical system configured to reduce a beam diameter of the plurality of beams collimated by the plurality of collimating lens;
   a focusing lens configured to focus the plurality of beams reduced by the reduction optical system on the fiber; and a collimator in which the light source and the collimating lens arranged so as to correspond to the beam passing through an end portion of the reduction optical system are integrated, wherein the collimator is inclined at a predetermined angle so that the beam is obliquely incident on the reduction optical system.

\* \* \* \* \*